United States Patent
Swarts et al.

(10) Patent No.: US 8,326,251 B2
(45) Date of Patent: Dec. 4, 2012

(54) METHOD AND SYSTEM FOR ESTIMATING A RECEIVER FREQUENCY OFFSET IN A COMMUNICATION SYSTEM

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 247 days.

(21) Appl. No.: 12/766,752

(22) Filed: Apr. 23, 2010

(65) Prior Publication Data

US 2011/0237214 A1  Sep. 29, 2011

Related U.S. Application Data

(60) Provisional application No. 61/318,660, filed on Mar. 29, 2010.

(51) Int. Cl.
*H04B 1/10* (2006.01)
(52) U.S. Cl. ............ 455/283; 455/296; 455/226.1
(58) Field of Classification Search .......... 455/283–285, 455/296, 226.1
See application file for complete search history.

(56) References Cited

U.S. PATENT DOCUMENTS

| | | | | |
|---|---|---|---|---|
| 5,023,940 | A | * | 6/1991 | Johnson et al. ............ 455/212 |
| 2004/0156422 | A1 | * | 8/2004 | Liljestrom .................. 375/148 |

* cited by examiner

*Primary Examiner* — Christian Hannon
(74) *Attorney, Agent, or Firm* — Sterne, Kessler, Goldstein & Fox PLLC

(57) ABSTRACT

A mobile device receives a radio frequency (RF) signal, comprising a physical signal such as a primary synchronization signal (PSS), from a serving base station. Two successive samples derived from the received physical signal such as a PSS are selected to generate a single phasor. A receiver frequency offset for the received RF signal is estimated utilizing the generated single phasor. A correlation process is performed to detect the received PSS. An angular increment in the first quadrant is calculated utilizing the generated single phasor. An actual angular increment subject to the receiver frequency offset is calculated based on the angular increment in the first quadrant and signs of real and imaginary components of the generated single phasor. The receiver frequency offset is determined based on the calculated actual angular increment and is utilized to adjust a reference or local oscillator frequency of the mobile device.

20 Claims, 9 Drawing Sheets

METHOD AND SYSTEM FOR ESTIMATING A RECEIVER FREQUENCY OFFSET IN A COMMUNICATION SYSTEM

CROSS-REFERENCE TO RELATED APPLICATIONS/INCORPORATION BY REFERENCE

This patent application makes reference to, claims priority to and claims the benefit from U.S. Provisional Patent Application Ser. No. 61/318,660 filed on Mar. 29, 2010.

This application makes reference to:
U.S. application Ser. No. 12/510,901 filed on Jul. 28, 2009;
U.S. application Ser. No. 12/510,956 filed on Jul. 28, 2009;
U.S. Application Ser. No. 61/312,555 filed on Mar. 10, 2010; and
U.S. application Ser. No. 12/732,052 filed on Mar. 25, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for estimating a receiver frequency offset in a communication system.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE/E-UTRA is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as antenna configuration indicator, full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for estimating a receiver frequency offset in a communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for estimating a receiver frequency offset in a communication system. A mobile device is operable to receive a radio frequency (RF) signal from an associated serving base station. The received RF signal may comprise a physical signal such as a pilot signal, a reference signal, a primary synchronization signal and/or a secondary synchronization signal. Two successive samples derived from the received physical signal such as a received PSS may be selected to generate a single phasor, p. A phasor is a vector that rotates around an origin of two perpendicular axes. The single phasor, p, may be generated by the expression $p=r_n r_{n-1}^* = p_{re} + jp_{im}$, where $r_n = x_n + jy_n$, $r_{n-1} = x_{n-1} + jy_{n-1}$ are phasors of the selected two successive samples, $r_{n-1}^*$ is the conjugate of $r_{n-1}$, and $p_{re}$, $p_{im}$ are the real and imaginary components of the generated single phasor, p. The mobile device may be operable to utilize the generated single phasor, p, to estimate a receiver frequency offset, $\Delta f^{Rx}$, for the received RF signal. The mobile device may be operable to detect the received PSS via a correlation process. The two successive samples may be selected from correlation data associated with the detected PSS. An angular increment in the first quadrant, $\Delta\theta^{first}$, may be calculated by the expression $$\Delta\theta^{first} = \tan^{-1}\left(\frac{|p_{im}|}{|p_{re}|}\right),$$

and an estimated $\Delta\theta^{first}$ may be obtained via a lookup table. An actual or true angular increment, $\Delta\theta^{true}$, subject to the receiver frequency offset, $\Delta f^{Rx}$, may be determined based on the estimated $\Delta\theta^{first}$ and corresponding signs of real and imaginary components, $p_{re}$, $p_{im}$. The receiver frequency offset, $\Delta f^{Rx}$, may be determined or calculated by the expression $$\Delta f^{Rx} = \frac{\Delta\theta^{true}}{2\pi} f_s,$$

where $f_s$ is a sampling frequency utilized for the two selected samples. The determined $\Delta f^{Rx}$ may be utilized to adjust a reference or local oscillator frequency of the mobile device.

Figure 1:
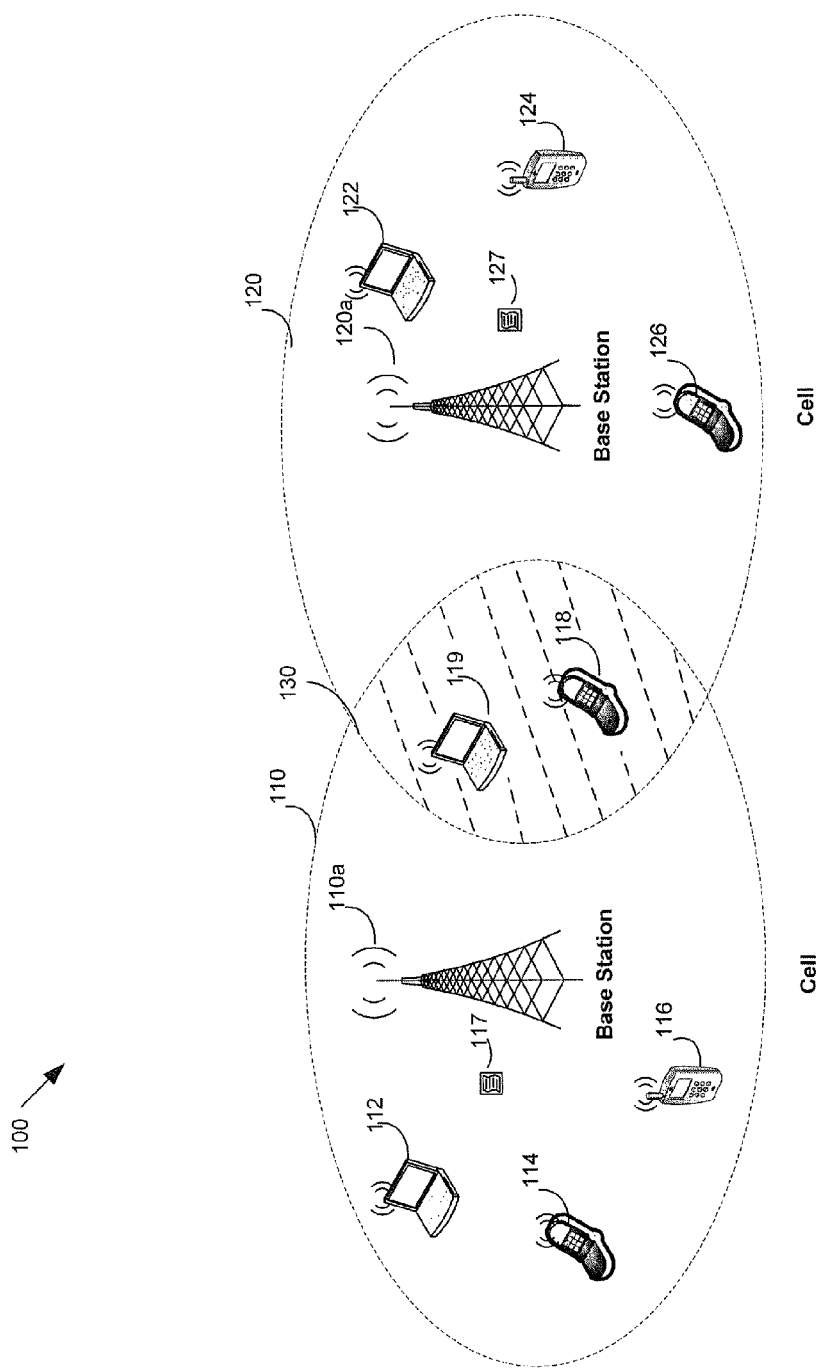
FIG. 1 is a diagram illustrating an exemplary wireless communication system that is operable to estimate a receiver frequency offset based on a single phasor derived from two successive samples of a received reference signal, in accordance with an embodiment of the invention.

FIG. 1 is a diagram illustrating an exemplary wireless communication system that is operable to estimate receiver frequency offset based on a single phasor derived from two successive samples of a received reference signal, in accordance with an embodiment of the invention. Referring to FIG. 1, there is shown a wireless communication system 100. The wireless communication system 100 comprises a plurality of cells, of which cells 110-120 are displayed. A coverage area 130 is the overlapped coverage area of the cell 110 and the cell 120. The cell 110 and the cell 120 are served by a base station 110a and a base station 120a, respectively. The wireless communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as reference signals and synchronization signals may not carry information from higher layers. Reference signals from the base station 110a may be utilized by mobile devices in the cell 110 to determine channel impulse responses (CIRs). A specified reference signal is assigned to each cell within a network and acts as a cell-specific identifier. Synchronization signals may comprise primary synchronization signals (PSS) and secondary synchronization signals (SSS). For example, in E-UTRA/LTE, the base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence. The scrambling code may be linked or mapped to, for example, the index of the PSS. After successful time and frequency synchronization via the PSS synchronization, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs is base station or cell specific.

The mobile device 118 may be operable to detect or select a particular PSS from the received plurality of PSSs to acquire PSS synchronization. The detected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively. In this regard, the PSS correlation data may be accumulated over one or several time slot duration. The resulting correlation peaks may be utilized as an indication of the possible PSS symbol timing hypotheses under consideration. Accordingly, the mobile device 118 may be operable to detect the particular PSS according to the resulting correlation peaks.

Due to, for example, oscillator inaccuracy, there may be a wide range of uncertainty in the correct PSS symbol timing and/or the correct local oscillator frequency for the mobile device 118. The uncertainties for the correct PSS symbol timing and/or the local oscillator frequency offset for the mobile device 118 may cause the mobile device 118 to fail to detect the particular PSS in instances when the frequency offset is large. Furthermore, the uncertainties may also cause the mobile device to erroneously detect the particular PSS when none may be present, or detect the particular PSS but fail to estimate the correct PSS symbol timing and/or the frequency offset, thereby resulting in an inability to properly establish synchronization between the base station 110a and the mobile device 118. In this regard, the mobile device 118 may be operable to utilize the PSS correlation data associated with the detected particular PSS to determine or estimate a local oscillator frequency offset or a receiver frequency offset of the mobile device 118 relative to a carrier frequency associated with the PSS transmission.

In accordance with various exemplary embodiments of the invention, for a given sampling frequency, $f_s$, two successive samples are selected from the PSS correlation data associated with the detected particular PSS by, for example, dividing the PSS correlation interval into two equal length intervals and obtaining a correlation vector or phasor for each of the two half correlation intervals. A single phasor may be generated by, for example, $p=r_n r_{n-1}^* = p_{re}+jp_{im}$, where $r_n=x_n+jy_n$, $r_{n-1}=x_{n-1}+jy_{n-1}$ are corresponding phasors for the selected two samples, respectively. $r_{n-1}^*$ is the conjugate of $r_{n-1}$, and $p_{re}$, $p_{im}$ represent the real and imaginary components of the generated single phasor, p. An angular increment in the first quadrant, $\Delta\theta^{first}$, may be calculated by $$\Delta\theta^{first} = \tan^{-1}\left(\frac{|p_{im}|}{|p_{re}|}\right).$$

In this regard, for given real and imaginary components $p_{re}$, $p_{im}$, $\Delta\theta^{first}$ may be chosen from a lookup table such as a lookup table 117 comprising first quadrant angular intervals and associated quantized angle values. A true or actual angular increment, $\Delta\theta^{true}$, subject to a receiver frequency offset, $\Delta f^{Rx}$, of the mobile device 118 may be determined or calculated based on the selected $\Delta\theta^{first}$ and corresponding signs of $p_{re}$, $p_{im}$. The receiver frequency offset, $\Delta f^{Rx}$, may be calculated through $$\Delta f^{Rx} = \frac{\Delta\theta^{true}}{2\pi} f_s,$$

where $f_s$ is a sampling frequency utilized for sampling the selected two successive samples. The calculated $\Delta f^{Rx}$ provides a frequency offset estimation between the carrier frequency of the base station 110a and the local oscillator frequency of the mobile device 118.

Although a PSS signal in received transmissions from the base station 110a is utilized to estimate a receiver frequency offset of the mobile device 118 relative to a carrier frequency associated with the received transmissions from the base station 110a is illustrated in FIG. 1, the invention need not be so limited. Accordingly, pilot signals, reference signals and/or any other physical signals, which are known a priori, in received transmissions from the base station 110a may also be utilized to estimate a receiver frequency offset of the mobile device 118 relative to a carrier frequency associated with the received transmissions without departing from the spirit and scope of various embodiments of the invention.

In an exemplary operation, the base station 110a may be operable to perform communications within the cell 110 using physical channels and physical signals such as a PSS and a SSS. The base station 110a may be operable to transmit base station specific PSS and SSS, regularly, for example, every 5 ms. To communicate with the base station 110a, a mobile device such as the mobile device 118 may be operable to acquire the PSS and SSS received from the base station 110a so as to determine one or more transmission parameters. For example, the mobile device 118 may be operable to acquire PSS synchronization to identify the PSS symbol timing and estimate a channel. In this regard, a receiver frequency offset, $\Delta f^{Rx}$, between the carrier frequency of the base station 110a and the local oscillator frequency of the mobile device 118 may be estimated utilizing two successive samples of, for example, PSS correlation data associated with the identified PSS. A single phasor may be generated utilizing the selected two successive samples. An angular increment in the first quadrant may be derived from absolute values of real and imaginary components of the generated single phasor. The estimated angular increment represents the angular difference between the two samples of the received reference signal. In this regard, a lookup table such as the lookup table 117 may be utilized to choose quantized angle values as an estimate for the angular increment in the first quadrant. An actual angular increment subject to the receiver frequency offset, $\Delta f^{Rx}$, may be determined based on the estimated angular increment in the first quadrant, and corresponding signs of the real and imaginary components of the generated single phasor.

Figure 2:
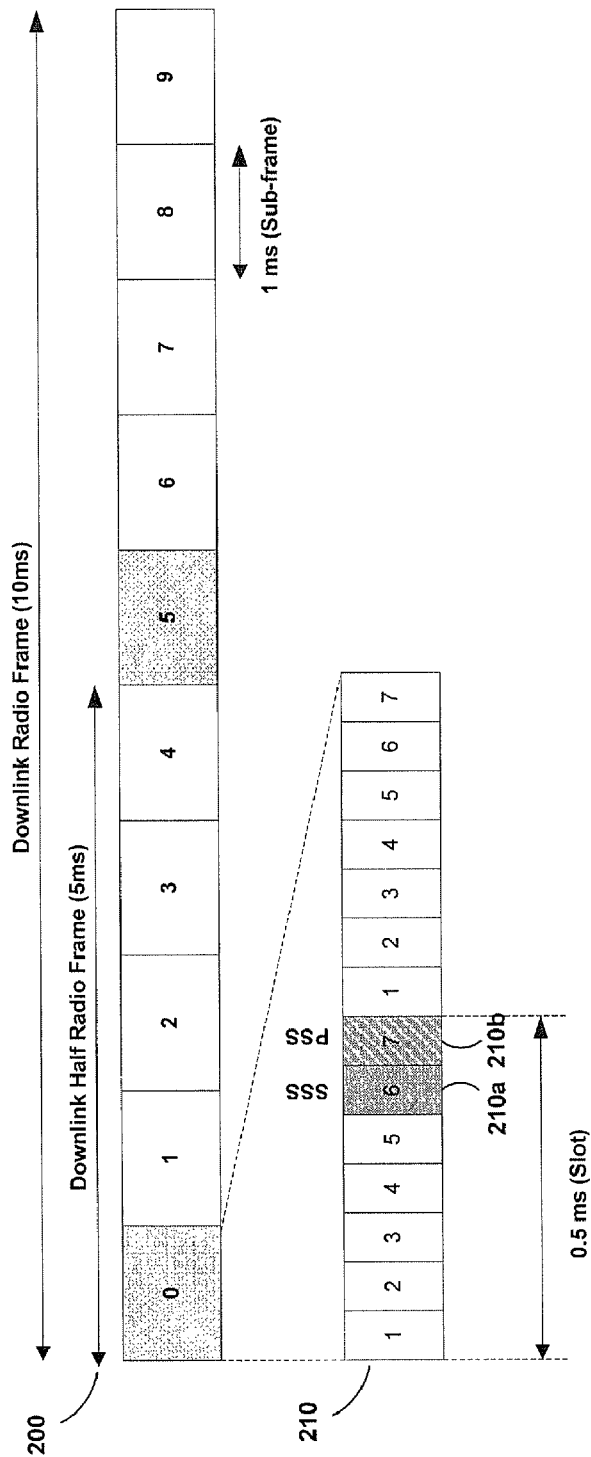
FIG. 2 is a block diagram of an exemplary downlink synchronization signal structure, which is utilized in accordance with an embodiment of the invention.

FIG. 2 is a block diagram of an exemplary downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated cell ID and/or antenna configuration.

The PSS 210a and the SSS 210b may be transmitted on sub-frame 0 and 5 of the downlink radio frame 200 and occupy two consecutive symbols in a corresponding sub-frame. The PSS 210b may be used to identify the symbol timing and the cell ID within a cell ID group. The SSS 210a may be used for identifying frame boundary, detecting cell ID group, and/or acquiring system parameters such as cyclic prefix (CP) length. The SSS detection for the SSS 210a may start after a successful PSS synchronization on the PSS 210b. The PSS synchronization may provide timing and frequency offset information for the downlink radio frame 200. To acquire accurate timing and frequency offset for the downlink radio frame 200, a PSS correlation process for the PSS 210b may be performed. Two successive correlation samples are selected from PSS correlation data associated with a peak correlation value by, for example, dividing the correlation interval into two equal length intervals. A single phasor may be generated utilizing phasors of the selected two successive samples. An angular increment subject to a receiver frequency offset may be determined or established utilizing the generated single phasor. The receiver frequency offset for the downlink radio frame 200 at the mobile device 118 may be estimated or calculated based on the determined angular increment.

Figure 3:
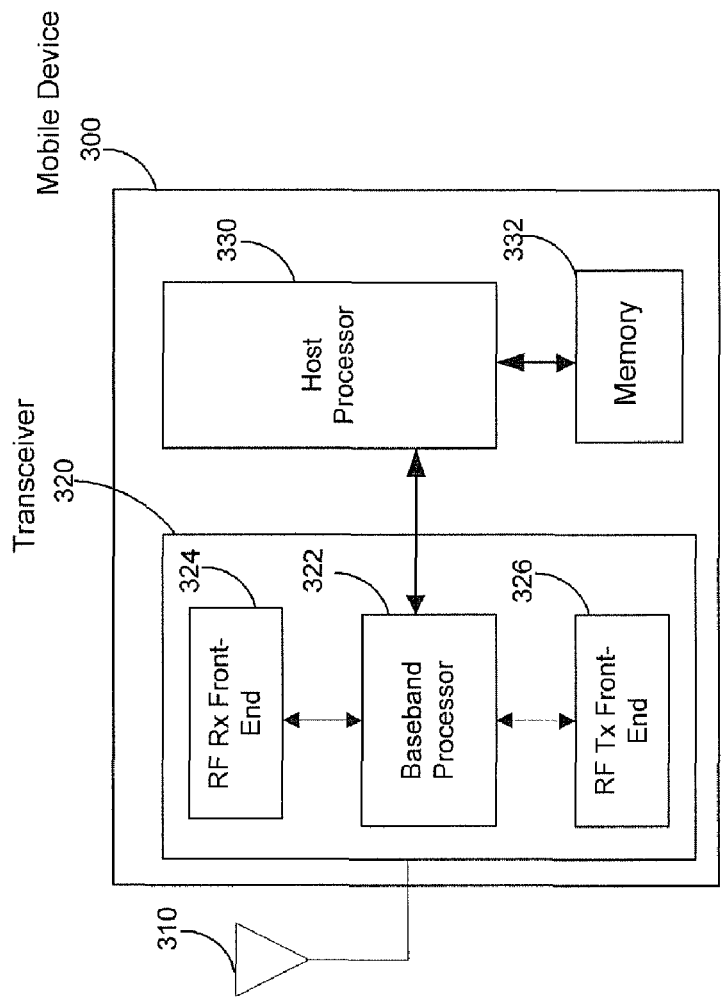
FIG. 3 is a block diagram of an exemplary mobile device that may be operable to estimate a receiver frequency offset based on a single phasor derived from two successive samples of a received reference signal, in accordance with an embodiment of the invention.

FIG. 3 is a block diagram of an exemplary mobile device that may be operable to estimate a receiver frequency offset based on a single phasor derived from two successive samples of a received reference signal, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 324. The received baseband signals may comprise physical signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring correct PSS timing and/or frequency offset.

Various factors such as, for example, propagation delay, Doppler shift, and/or oscillator drift, may cause a wide range of uncertainties on the correct PSS symbol timing and/or frequency offset. In this regard, the baseband processor 322 may be operable to estimate a receiver frequency offset of the mobile device 300 relative to a carrier frequency associated with the PSS transmission starting with a PSS correlation process. The received PSS may be detected based on the maximum PSS correlation peak magnitude. The baseband processor 322 may be operable to select two successive samples from PSS correlation data associated with the detected PSS. The selected two successive samples may be represented by corresponding phasors, $r_n$, $r_{n-1}$. A single phasor may be generated by utilizing, for example, the expression $p=r_n r_{n-1}^*=p_{re}+jp_{im}$, where $r_{n-1}^*$ is the conjugate of $r_{n-1}$. $p_{re}$, $p_{im}$ are the real and imaginary components of the generated single phasor, p. An angular increment, $\Delta\theta$, subject to a receiver frequency offset, $\Delta f^{Rx}$, of the mobile device 300 may be determined or calculated utilizing the generated single phasor. In this regard, the baseband processor 322 may initially calculate an angular increment in the first quadrant, $\Delta\theta^{first}$, by the expression $$\Delta\theta^{first} = \tan^{-1}\left(\frac{|p_{im}|}{|p_{re}|}\right).$$

A lookup table such as the lookup table 117, which comprises first quadrant angular intervals and associated quantized angle values, may be utilized to choose an estimated $\Delta\theta^{first}$ for given $p_{re}$, $p_{im}$. An actual or true angular increment, $\Delta\theta^{true}$, subject to the receiver frequency offset, $\Delta f^{Rx}$, may be determined based on the selected estimated $\Delta\theta^{first}$ and corresponding signs of the real and imaginary components, $p_{re}$, $p_{im}$. The receiver frequency offset, $\Delta f^{Rx}$, may be calculated by the expression $$\Delta f^{Rx} = \frac{\Delta\theta^{true}}{2\pi} f_s,$$

where $f_s$ is a sampling frequency utilized for the selected two successive samples. The baseband processor 322 may be operable to utilize the calculated $\Delta f^{Rx}$ to adjust a reference or local oscillator frequency of the mobile device 300.

The host processor 330 may comprise suitable logic, circuitry, interfaces and/or code that may be operable to manipulate and control operation of the transceiver 320. The host processor 330 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes, such as synchronization and/or channel estimation. The memory 332 may comprise RAM, ROM, low latency nonvolatile memory such as flash memory and/or other suitable electronic data storage.

In an exemplary operation, the RF Rx front-end 324 may be operable to process RF signals received via the antenna 310 over the LTE/E-UTRA air interface, for example. The received RF signals may comprise physical signals such as PSSs and SSSs transmitted by base stations such as the base station 110a and/or the base station 120a. The received RF signals may be converted to corresponding baseband signals and communicated with the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of correlation reference sequences (reference PSSs) for acquiring PSS synchronization. To acquire accurate PSS symbol timing and/or frequency offset, the baseband processor 322 may be operable to estimate a receiver frequency offset, $\Delta f^{Rx}$, of the mobile device 300 relative to a carrier frequency associated with the PSS transmission. For a given sampling frequency, $f_s$, the baseband processor 322 may be operable to select two successive samples from PSS correlation data associated with the detected PSS. A single phasor may be generated by combining phasors for the selected two successive samples. An angular increment, $\Delta\theta$, subject to a receiver frequency offset, $\Delta f^{Rx}$, of the mobile device 300 may be determined utilizing the generated single phasor. The determined angular increment, $\Delta\theta$, may be utilized to calculate the receiver frequency offset, $\Delta f^{Rx}$, by the expression $$\Delta f^{Rx} = \frac{\Delta\theta}{2\pi} f_s,$$

where $f_s$ is a sampling frequency utilized for the selected two successive samples. A reference or local oscillator frequency of the mobile device 300 may be adjusted based on the calculated receiver frequency offset, $\Delta f^{Rx}$.

Figure 4:
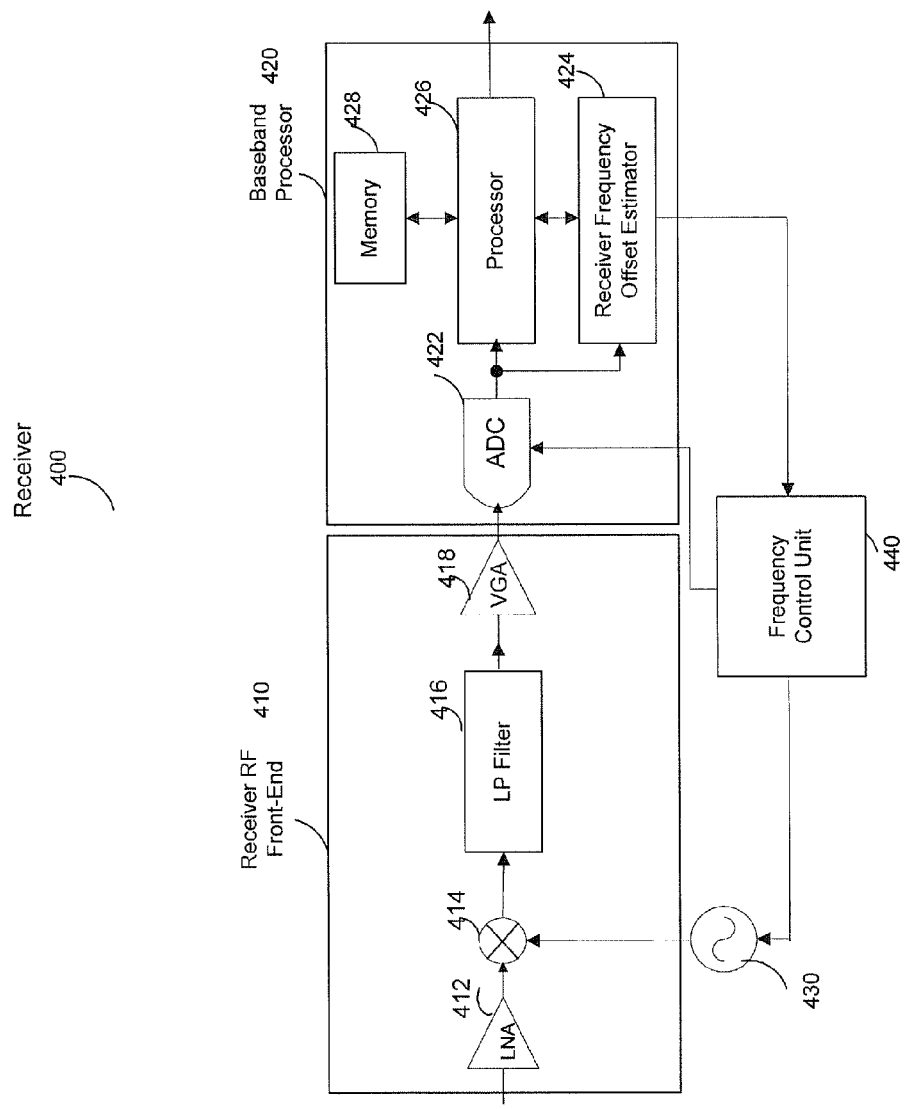
FIG. 4 is a block diagram illustrating an exemplary receiver that is operable to estimate a receiver frequency offset based on a single phasor derived from two successive samples of a received reference signal, in accordance with an embodiment of the invention.

FIG. 4 is a block diagram illustrating an exemplary receiver that is operable to estimate a receiver frequency offset based on a single phasor derived from two successive samples of a received reference signal, in accordance with an embodiment of the invention. Referring to FIG. 4, there is shown a receiver 400. The receiver 400 comprises a receiver radio frequency (RF) front-end 410, a baseband processor 420, a local oscillator 430 and a frequency control unit 440. The receiver RF front-end 410 comprises a low noise amplifier (LNA) 412, a mixer 414, a low pass (LP) filter 416, and a variable-gain amplifier (VGA) 418. The baseband processor 420 comprises an analog-to-digital converter (ADC) 422, a receiver frequency offset estimator 424, a processor 426 and a memory 428.

The receiver RF front-end 410 may comprise suitable logic, circuitry, interfaces and/or code that may be operable to process a RF signal received via the antenna 310. The received RF signal may comprise physical signals such as a PSS and a SSS. The receiver RF front-end 410 may be operable to convert the received RF signal to a corresponding baseband signal, which may be further processed by the baseband processor 420.

The LNA 412 may comprise suitable logic, circuitry, interfaces and/or code that may be operable to amplify a RF signal received by the antenna 310. The LNA 412 may be operable to essentially set a limit for how low a system noise figure may reach. The LNA 412 may be enabled to achieve a low noise performance, which is crucial for a high performance radio frequency (RF) front end.

The mixer 414 may comprise suitable logic, circuitry, interfaces and/or code that may be operable to translate the amplified RF signal from the LNA 412 to a lower, intermediate frequency (IF) signal using sinusoidal signals derived from a local oscillator 430.

The LP filter 416 may comprise suitable logic, circuitry, interfaces and/or code that may be operable to filter the IF signal from the mixer 414 so as to remove unwanted signal components.

The VGA 418 may comprise suitable logic, circuitry, interfaces and/or code that may be operable to amplify the analog baseband signal from the LP filter 416. The VGA 418 may be operable to set different gains for the analog baseband signal resulting in a variable signal level at the input to the ADC 422.

The ADC 422 may comprise suitable logic, circuitry, interfaces and/or code that may be operable to convert analog baseband signals received from the VGA 418 of the receiver RF front-end 410 to a corresponding digital baseband signal (e.g., digital samples). The ADC 422 may be operable to sample the received analog baseband signal at an analog-to-digital sampling rate of, for example, 1.92 MHz, which is derived from the reference frequency provided by the reference oscillator contained in the frequency control unit 430. The resulting digital baseband signal may comprise values that are representative of the analog baseband signal amplitudes. The digital baseband signal may be communicated with the receiver frequency offset estimator 424 for a receiver frequency offset estimate. The digital baseband signal may also be communicated to the processor 426 for other baseband processing such as the SSS detection.

The receiver frequency offset estimator 424 may comprise suitable logic, circuitry, interfaces and/or code that may be operable to process the digital baseband signal from the ADC 422 to estimate a receiver frequency offset, $\Delta f^{Rx}$, relative to a carrier frequency associated with the received RF signal. In this regard, the receiver frequency offset estimator 424 may be operable to perform a PSS correlation process on the received digital baseband signal. A PSS in the received digital baseband signal may be detected based on the maximum PSS correlation peak magnitude. Two successive samples may be selected from PSS correlation data associated with the detected PSS. Assume that $r_n$, $r_{n-1}$ are corresponding phasors for the selected two successive samples, the receiver frequency offset estimator 424 may be operable to generate a single phasor utilizing, for example, the expression $p=r_n r_{n-1}^*=p_{re}+jp_{im}$, where $r_{n-1}^*$ is the conjugate of $r_{n-1}$ and $p_{re}$, $p_{im}$ are the real and imaginary components of the generated single phasor, p. A receiver frequency offset, $\Delta f^{Rx}$, may be determined or calculated based on a corresponding angular increment, $\Delta\theta$. In this regard, an angular increment in the first quadrant, $\Delta\theta^{first}$, may be calculated utilizing the generated single phasor, p, specifically, the expression $$\Delta\theta^{first} = \tan^{-1}\left(\frac{|p_{im}|}{|p_{re}|}\right).$$

The angular increment, $\Delta\theta$, corresponding to the receiver frequency offset, $\Delta f^{Rx}$, may be determined based on the calculated $\Delta\theta^{first}$ and corresponding signs of the real and imaginary components, $p_{re}$, $p_{im}$. The receiver frequency offset estimator 424 may calculate the receiver frequency offset, $\Delta f^{Rx}$, by the $$\Delta f^{Rx} = \frac{\Delta\theta}{2\pi} f_s,$$

expression where $f_s$ is a sampling frequency utilized for the selected two successive samples. The calculated receiver frequency offset, $\Delta f^{Rx}$, may be communicated to the frequency control unit 440 to adjust a reference or local oscillator frequency of the receiver 400, thereby in turn adjusting the local oscillator 430 frequency and ADC 422 sampling frequency.

The processor 426 may comprise suitable logic, circuitry, interfaces and/or code that may be operable to process digital baseband signals from the ADC 422. The processor 426 may be operable to perform various baseband procedures such as the SSS detection using information such as the detected PSS, PSS symbol timing and/or receiver frequency offset estimates from the receiver frequency offset estimator 424. For example, the processor 426 may be operable to determine SSS scrambling codes based on the detected PSS from the receiver frequency offset estimator 424. The processor 426 may be operable to descramble the SSS signals using the determined scrambling code. The processor 426 may be operable to process the descrambled SSS signals for cell ID detection. The processor 426 may be operable to determine the SSS position based on the PSS symbol timing provided by the receiver frequency offset estimator 424. The determined SSS position may indicate, for example, frame boundary of transmissions in an associated cell. The processor 426 may be operable to perform SSS decoding based on the determined SSS position for identifying cell-specific parameters such as, for example, cell ID group, reference signal sequences, and/or antenna configuration. Various system parameters such as cyclic prefix (CP) length may be identified via the SSS decoding. The identified cell-specific parameters and system parameters may ensure proper communications between the receiver 400 and an associated base station such as, the base station 110a.

The memory 428 may comprise suitable logic, circuitry, interfaces and/or code that may be operable to store information such as executable instructions and data that may be utilized by associated components such as the processor 426 in the receiver 400. The executable instructions may comprise algorithms that may be applied to various baseband procedures such as channel estimation, channel equalization, and/or channel coding. The data may comprise timing and/or frequency hypothesis. The memory 428 may comprise RAM, ROM, low latency nonvolatile memory such as flash memory and/or other suitable electronic data storage.

The local oscillator 430 may comprise suitable logic, circuitry, interfaces and/or code that may be operable to communicate with the frequency control unit 440 to provide a local oscillator frequency to the mixer 414 of the receiver 400.

The frequency control unit 440 may comprise suitable logic, circuitry, interfaces and/or code that may be operable to control the settings for the corresponding reference frequency of the local oscillator 430 and the ADC 422. The frequency control unit 440 may be operable to adjust the reference frequencies of the local oscillator 430 and the ADC 422, respectively, according to the receiver frequency offset estimates from the receiver frequency offset estimator 424. The operation of the frequency control unit 440 may be operable to control the timing and/or the local oscillator frequency of the receiver 400.

In an exemplary operation, the receiver 400 may be operable to receive a RF signal from the antenna 310, for example. The received RF signal may comprise physical signals such as a PSS and a SSS. The receiver RF front-end 410 may be operable to amplify the received RF signal via the LNA 412 and convert to a baseband frequency signal via the mixer 414 and the LP filter 416, respectively. The baseband signal may be amplified via the VGA 418 and converted to a digital baseband signal via the ADC 422. The digital baseband signal may be processed by the receiver frequency offset estimator 424 to acquire accurate PSS timing and/or receiver frequency offset. The receiver frequency offset estimator 424 may be operable to perform a PSS correlation process on the received digital baseband signal. The PSS in the received digital baseband signal may be detected based on the maximum PSS correlation peak magnitude. A single phasor may be generated utilizing two successive samples selected from PSS correlation data associated with the detected PSS. An angular increment, $\Delta\theta$, subject to a receiver frequency offset, $\Delta f^{Rx}$, may be determined or calculated utilizing the generated single phasor. The receiver frequency offset estimator 424 may be operable to calculate the receiver frequency offset, $\Delta f^{Rx}$, by the expression $$\Delta f^{Rx} = \frac{\Delta\theta}{2\pi} f_s,$$

where $f_s$ is a sampling frequency utilized for the selected two successive samples. The calculated receiver frequency offset, $\Delta f^{Rx}$, may be communicated to the frequency control unit 440 so as to adjust a reference or local oscillator frequency of the receiver 400, thereby in turn adjusting the local oscillator 430 frequency and ADC 422 sampling frequency. The detected PSS, PSS timing, and/or calculated receiver frequency offset, $\Delta f^{Rx}$, may be communicated to the processor 426, which may utilize them for performing other baseband procedures or functions such as the SSS detection.

Figure 5:
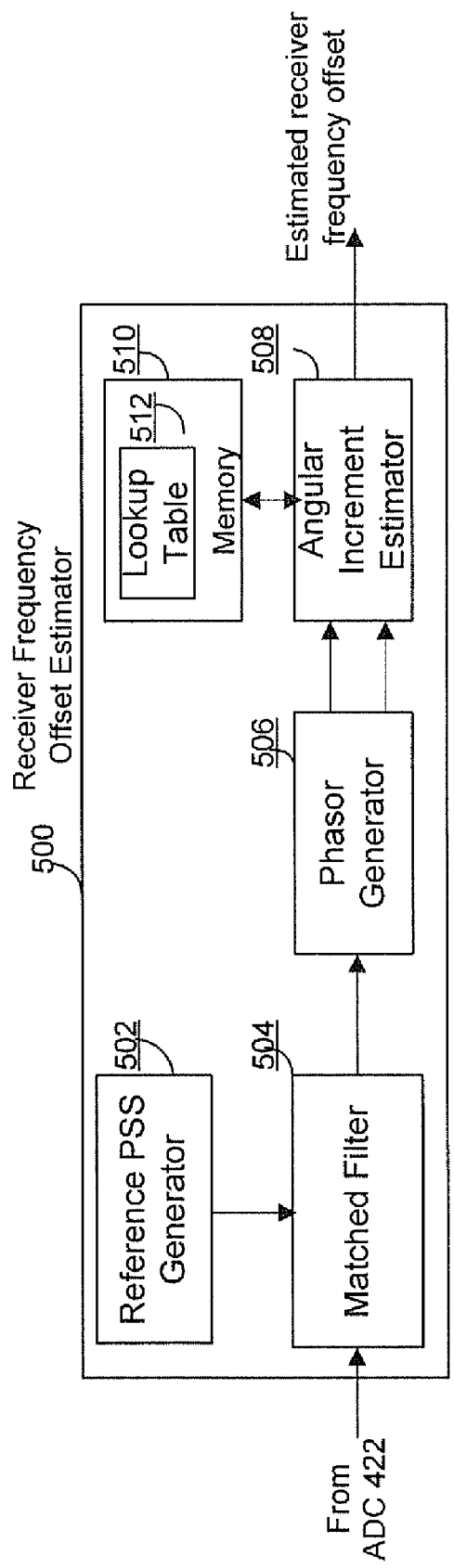
FIG. 5 is a block diagram illustrating an exemplary receiver frequency offset estimator that is operable to estimate a receiver frequency offset based on a single phasor derived from two successive samples of a received reference signal, in accordance with an embodiment of the invention.

FIG. 5 is a block diagram illustrating an exemplary receiver frequency offset estimator that is operable to estimate receiver frequency offset based on a single phasor derived from two successive samples of a received reference signal, in accordance with an embodiment of the invention. Referring to FIG. 5, there is shown a receiver frequency offset estimator 500 comprising a reference PSS generator 502, a matched filter 504, a phasor generator 506, an angular increment estimator 508 and a memory 510. The memory 510 comprises a lookup table 512.

The correlation reference PSS generator 502 may comprise suitable logic, circuitry, interfaces and/or code that may be operable to generate a plurality of reference PSSs.

The matched filter 504 may comprise suitable logic, circuitry, interfaces and/or code that may be operable to correlate signals from the ADC 422 with each of a plurality of reference PSSs generated by the reference PSS generator 502. The resulting PSS correlation data may be provided to the phasor generator 506.

The phasor generator 506 may comprise suitable logic, circuitry, interfaces and/or code that may be operable to sample PSS correlation data associated with the maximum PSS correlation peak magnitude. Two successive samples may be selected. The phasor generator 506 may be operable to generate corresponding phasors, $r_n$, $r_{n-1}$, for the selected two successive samples. The generated phasors $r_n$, $r_{n-1}$ may be communicated to the angular increment estimator 508 for further processing.

The angular increment estimator 508 may comprise suitable logic, circuitry, interfaces and/or code that may be operable to estimate an angular increment subject to a receiver frequency offset, $\Delta f^{Rx}$, of the receiver 400. In this regard, the angular increment estimator 508 may be operable to combine the two phasors $r_n$, $r_{n-1}$ from the phasor generator 506 to a single phasor, p. Specifically, the angular increment estimator 508 may be operable to calculate the single phasor, p, by the expression $p = r_n r_{n-1}^* = p_{re} + j p_{im}$, where $r_{n-1}^*$ is the conjugate of $r_{n-1}$ and $p_{re}$, $p_{im}$ are the real and imaginary components of the single phasor, p. The single phasor, p, may be utilized to determine an angular increment, $\Delta\theta$, subject to the receiver frequency offset, $\Delta f^{Rx}$, of the receiver 400. In this regard, the angular increment estimator 508 may be configured to initially calculate an angular increment in the first quadrant, $\Delta\theta^{first}$, by the expression $$\Delta\theta^{first} = \tan^{-1}\left(\frac{|p_{im}|}{|p_{re}|}\right).$$

The $\Delta\theta^{first}$ may be estimated utilizing the lookup table 512 for the given $p_{re}$, $p_{im}$. The angular increment $\Delta\theta$ may be determined based on the estimated $\Delta\theta^{first}$ and corresponding signs of $p_{re}$, $p_{im}$. The angular increment estimator 508 may calculate the receiver frequency offset, $\Delta f^{Rx}$, by the expression $$\Delta f^{Rx} = \frac{\Delta\theta}{2\pi}f_s,$$

where $f_s$ is a sampling frequency utilized for the selected two successive samples. The calculated receiver frequency offset, $\Delta f^{Rx}$, may be communicated to the frequency control unit 440 so as to adjust a reference or local oscillator frequency of the receiver 400.

The memory 510 may comprise suitable logic, circuitry, interfaces and/or code that may be operable to store information such as executable instructions and data that may be utilized by associated components such as the angular increment estimator 508. The executable instructions may comprise algorithms that may be applied to determine or choose an estimate of $\Delta\theta^{first}$ for given $p_{re}$, $p_{im}$ from the lookup table 512.

The lookup table 512 may comprise first quadrant angle intervals and associated quantized angle values for various $$\tan(\theta^{first}) = \frac{|p_{im}|}{|p_{re}|}$$

values. For example, for given real and imaginary components, $p_{re}$, $p_{im}$, the interval within which the $\Delta\theta^{first}$ falls may be determined by determining $m_1$, $m_2$ such that the expression $m_1|p_x| \leq |p_y| < m_2|p_x|$ is satisfied.

In an exemplary operation, the receiver frequency offset estimator 500 may be operable to receive a digital baseband signal from the ADC 422. The received digital baseband signal may comprise physical signals such as a PSS and a SSS. The received digital baseband signal may be processed for an accurate receiver frequency offset of corresponding transmission. A PSS correlation process may be performed by the matched filter 504 on the received digital baseband signal. In this regard, the matched filter 504 may be operable to correlate the received digital baseband signal with each of a plurality of reference PSSs provided by the reference PSS generator 502. Resulting correlation data may be communicated to the phasor generator 506. The phasor generator 506 may be operable to select two successive samples from correlation data associated with a maximum PSS correlation peak magnitude. The phasor generator 506 may generate corresponding phasors, $r_n$, $r_{n-1}$, for the selected two successive samples. The angular increment estimator 508 may be operable to estimate an angular increment, $\Delta\theta$, subject to a receiver frequency offset, $\Delta f^{Rx}$, of an associated receiver such as the receiver 400. A single phasor, p, may be generated by combing the two phasors $r_n$, $r_{n-1}$ from the phasor generator 506, namely, $p = r_n r_{n-1}^* = p_{re} + jp_{im}$, where $r_{n-1}^*$ is the conjugate of $r_{n-1}$ and $p_{re}$, $p_{im}$ are the real and imaginary components of the single phasor, p. For a given $p_{re}$, $p_{im}$, an angular increment in the first quadrant, $\Delta\theta^{first}$, may be estimated utilizing the lookup table 512. The angular increment, $\Delta\theta$, may be determined based on the estimated $\Delta\theta^{first}$ and corresponding signs of $p_{re}$, $p_{im}$. The corresponding receiver frequency offset, $\Delta f^{Rx}$, may be determined or calculated by the expression $$\Delta f^{Rx} = \frac{\Delta\theta}{2\pi}f_s,$$

where $f_s$ is a sampling frequency utilized for the selected two successive samples. The receiver frequency offset estimator 500 may be operable to communicate the calculated receiver frequency offset, $\Delta f^{Rx}$, to the frequency control unit 440 to adjust a reference or local oscillator frequency of the receiver 400.

Figure 6:
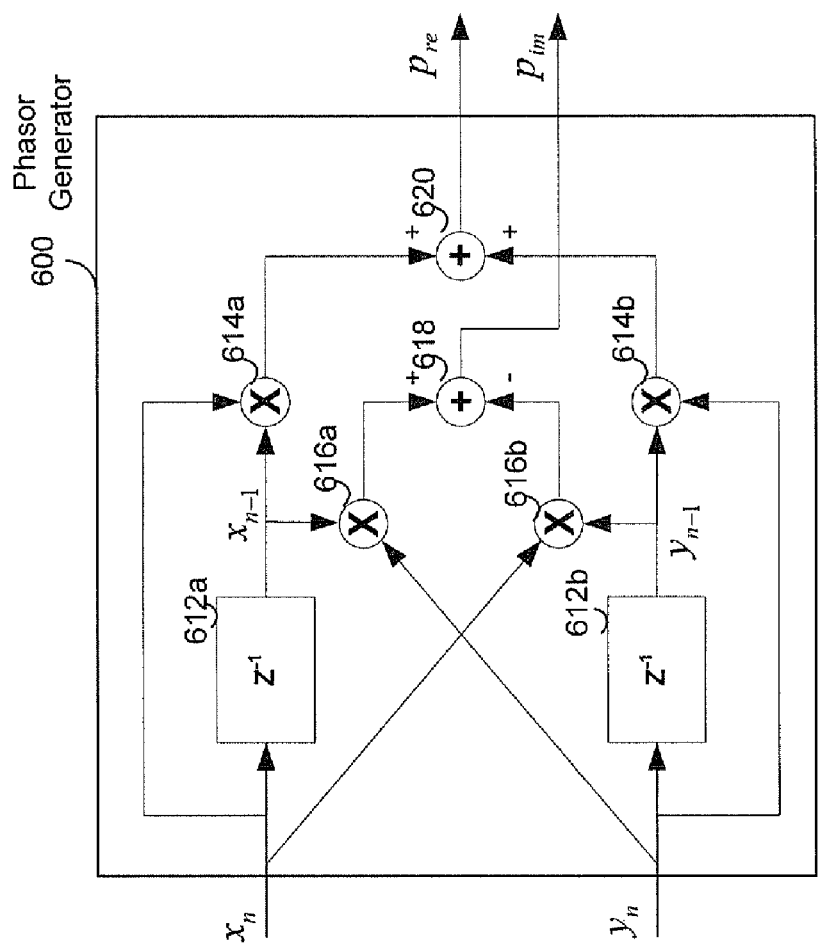
FIG. 6 is a block diagram illustrating an exemplary implementation for a phasor generator that is operable to generate a single phasor utilizing two successive samples of a received reference signal, in accordance with an embodiment of the invention.

FIG. 6 is a block diagram illustrating an exemplary implementation for a phasor generator that is operable to generate a single phasor utilizing two successive samples of a received reference signal, in accordance with an embodiment of the invention. Referring to FIG. 6, there is shown a phasor generator 600. The phasor generator 600 comprises delay units 612a and 612b, multipliers 614a-616b, adders 618-620.

The delay units 612a and 612b may comprise suitable logic, circuitry, interfaces and/or code that may be operable to time delay input samples, $r_n = x_n + jy_n$ by one sampling instant in order to retain the samples for a single sampling instant. The delayed or retained sample is denoted by $r_{n-1} = x_{n-1} + jy_{n-1}$. The two complex valued input samples, $r_n$, $r_{n-1}$, are phasors for two successive samples selected from a received reference signal such as a received PSS. The phasor generator 600 may be operable to output real and imaginary components, $p_{re}$, $p_{im}$, for a single phasor $p = p_{re} + jp_{im}$, respectively. The real and imaginary components $p_{re}$, $p_{im}$ may be implemented via the multipliers 614a-616b and adders 618-620 as $p_{re} = x_n x_{n-1} + y_n y_{n-1}$ and $p_{im} = x_{n-1} y_n - x_n y_{n-1}$, respectively. The real and imaginary components $p_{re}$, $p_{im}$ may be communicated to the angular increment estimator 508 to calculate corresponding receiver frequency offset, $\Delta f^{Rx}$.

Figure 7:
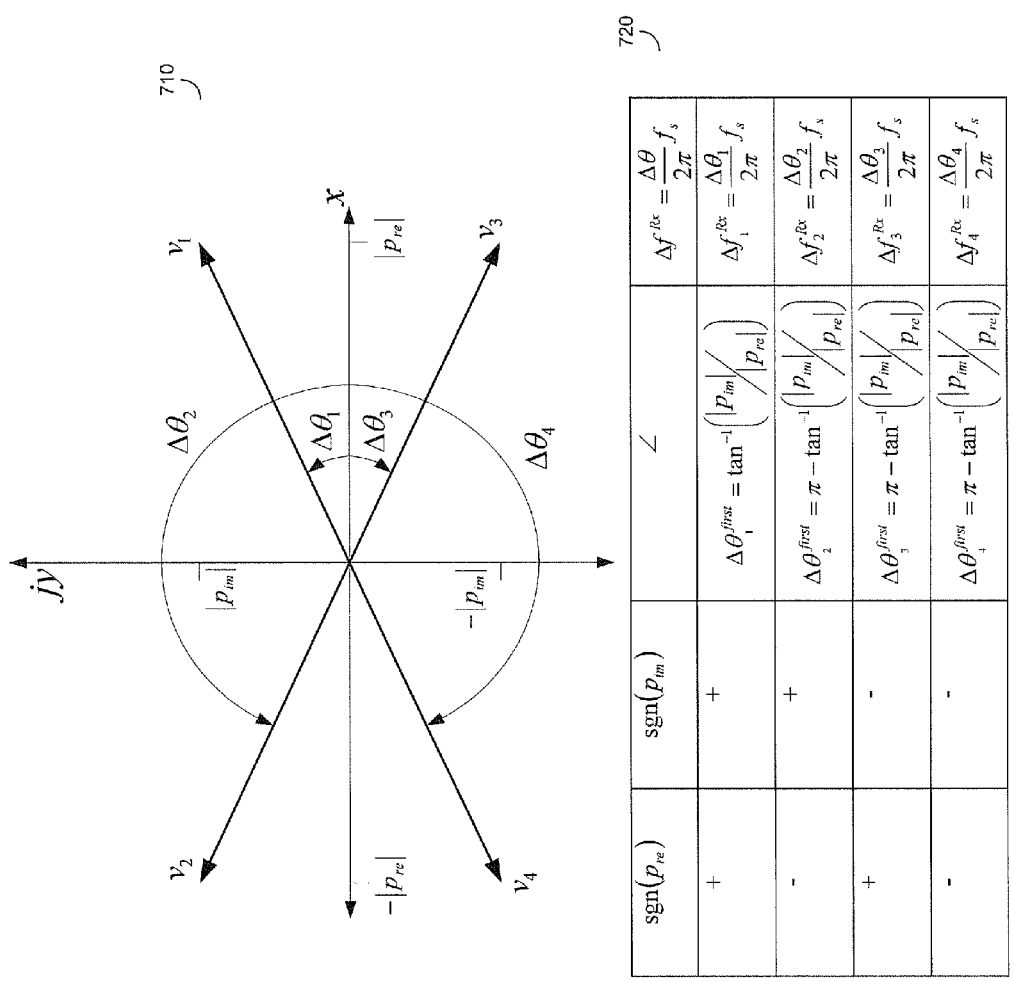
FIG. 7 is a diagram illustrating an exemplary means of establishing an angular increment subject to a receiver frequency offset, in accordance with an embodiment of the invention.

FIG. 7 is a diagram illustrating an exemplary means of establishing an angular increment subject to a receiver frequency offset, in accordance with an embodiment of the invention. Referring to FIG. 7, there are shown a polar coordinate system 710 and a table 720 for establishing an angular increment, $\Delta\theta$, subject to a receiver frequency offset, $\Delta f^{Rx}$, of an associated receiver such as the receiver 400. Four phasors $v_1$, $v_2$, $v_3$, $v_4$ are illustrated in the polar coordinate system 710. For given real and imaginary components, $p_{re}$, $p_{im}$, of $v_1$, $v_2$, $v_3$, $v_4$, corresponding angular increment in the first quadrant may be determined by the expression $$\Delta\theta_i^{first} = \tan^{-1}\left(\frac{|p_{im}|}{|p_{re}|}\right),$$

i=1, 2, 3, 4. An actual angular increment, $\Delta\theta$, subject to a receiver frequency offset, $\Delta f^{Rx}$, may be derived based on a corresponding angular increment in the first quadrant and the signs of $p_{re}$, $p_{im}$. For example, in instances where associated signs for $p_{re}$, $p_{im}$ are positive, an actual $\Delta\theta$ may be represented by the expression $\Delta\theta = \Delta\theta^{first}$. The corresponding receiver frequency offset, $\Delta f^{Rx}$, may be calculated utilizing the expression $$\Delta f^{Rx} = \frac{\Delta\theta}{2\pi} f_s.$$

Figure 8:
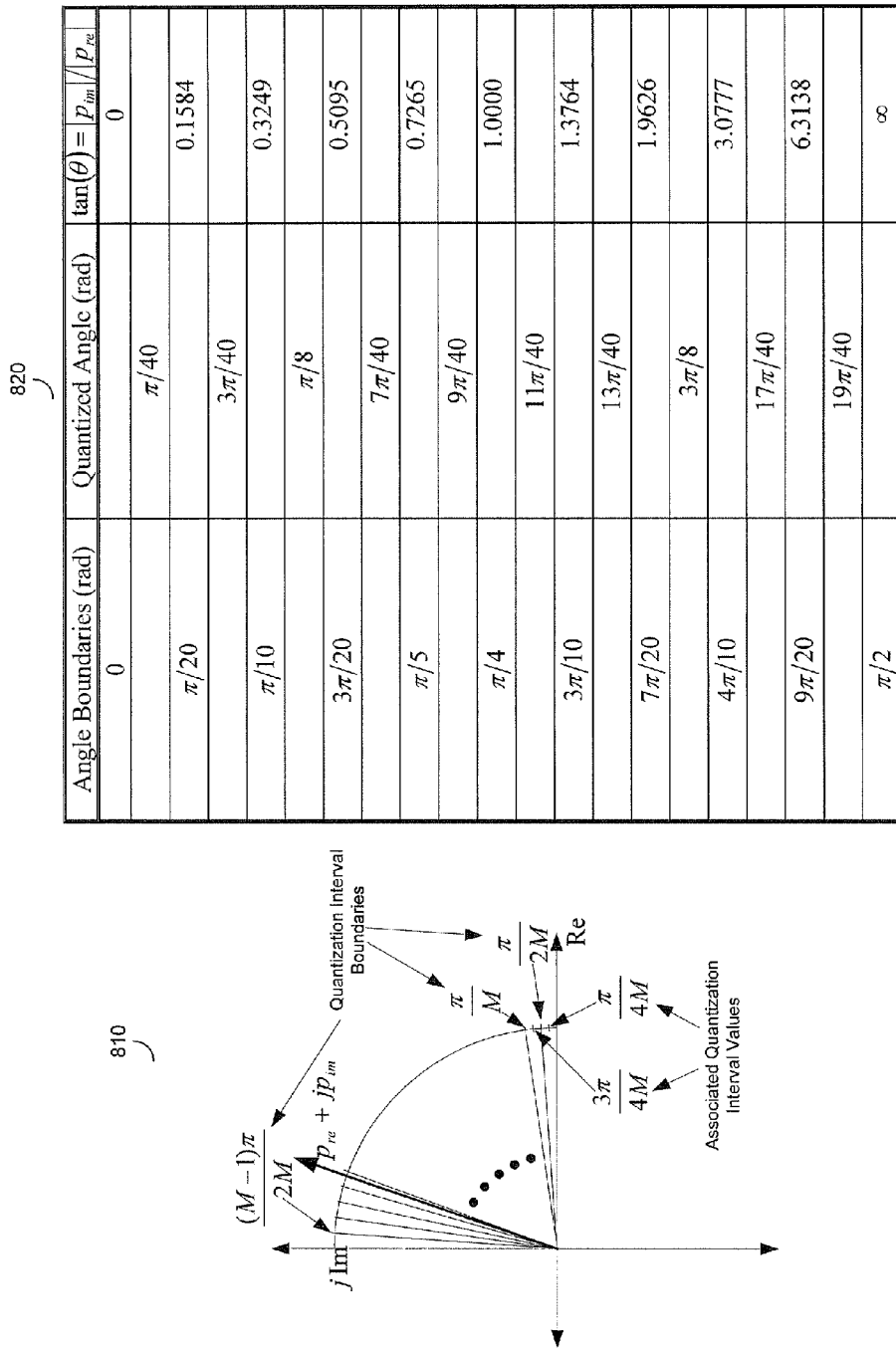
FIG. 8 is a diagram illustrating exemplary quantization intervals and associated quantized angles, in accordance with an embodiment of the invention.

FIG. 8 is a diagram illustrating exemplary quantization intervals and associated quantized angles, in accordance with an embodiment of the invention. Referring to FIG. 8, there are shown a polar coordinate system 810 and a lookup table 820 for choosing an estimated angular increment in the first quadrant for given real and imaginary components, $p_{re}$, $p_{im}$, of a phasor, $p = p_{re} + jp_{im}$. In FIG. 8, it is shown that, for given real and imaginary components, $p_{re}$, $p_{im}$, an estimated angular increment in the first quadrant may be determined by determining $m_1$, $m_2$ such that the expression $m_1|p_x| \leq |p_y| < m_2|p_x|$. The accuracy of the estimated angular increment in the first quadrant is determined based on quantization level utilized for the lookup table 820.

Figure 9:
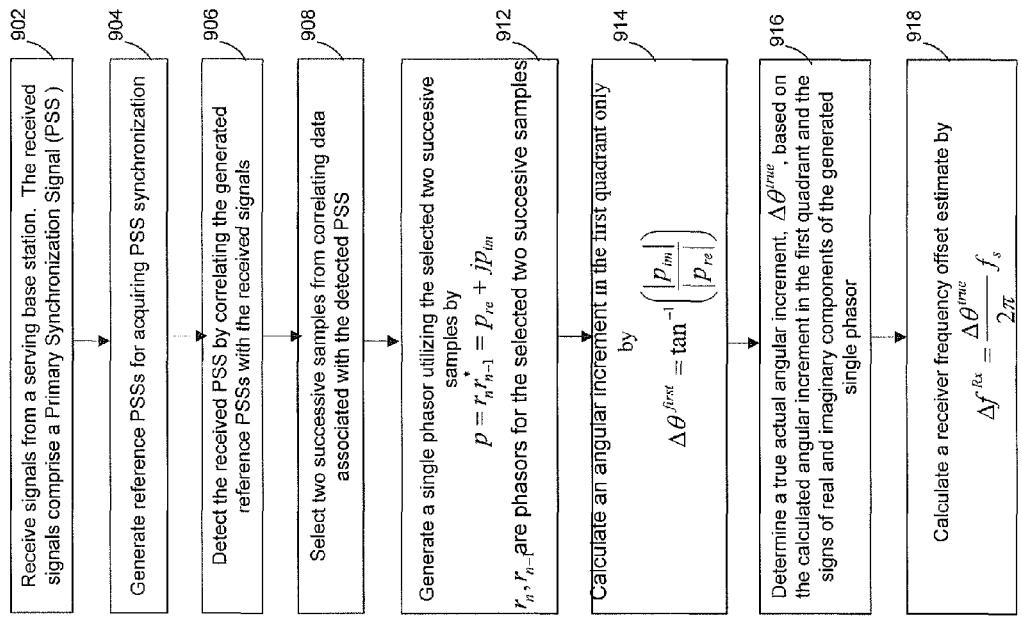
FIG. 9 is a flow chart illustrating an exemplary procedure that is utilized to estimate a receiver frequency offset based on a single phasor derived from two successive samples of a received reference signal, in accordance with an embodiment of the invention.

FIG. 9 is a flow chart illustrating an exemplary procedure that is utilized to estimate a receiver frequency offset based on a single phasor derived from two successive samples of a received reference signal, in accordance with an embodiment of the invention. The exemplary steps may start with the step 902. In step 902, a mobile device such as the mobile device 200 may be operable to receive signals from a serving base station such as the base station 110a. The received signals may comprise physical signals such as a Primary Synchronization Signal (PSS). In step 904, the reference PSS generator 502 may be operable to generate a plurality of reference PSSs for acquiring PSS synchronization. In step 906, the received PSS may be detected by correlating the generated reference PSSs with the received signals. The detected PSS may be indicated by a maximum PSS correlation peak magnitude at the output of the matched filter 504. In step 908, the phasor generator 504 may select two successive samples from correlating data associated with the detected PSS and this may be achieved, for example, by dividing the PSS correlation interval into two equal length intervals and obtaining a correlation vector or phasor for each of the two half correlation intervals. In step 912, the phasor generator 504 may be operable to generate a single phasor utilizing the selected two successive samples, that is, $p = r_n r_{n-1}^* = p_{re} + jp_{im}$, where $r_n$, $r_{n-1}$ are phasors for the selected two successive samples, $r_{n-1}^*$ is the conjugate of $r_{n-1}$, and $p_{re}$, $p_{im}$ are the real and imaginary components of the generated single phasor, p. The phasor generator 506 may be operable to communicate $p_{re}$, $p_{im}$ to the angular increment estimator 508. In step 914, the angular increment estimator 508 may be operable to calculate an angular increment in the first quadrant, $\Delta\theta^{first}$, by $$\Delta\theta^{first} = \tan^{-1}\left(\frac{|p_{im}|}{|p_{re}|}\right).$$

As described with respect to FIG. 6, an estimated $\Delta\theta^{first}$ may be retrieved by utilizing the lookup table 820. In step 916, the angular increment estimator 508 may be operable to determine an actual or true angular increment, $\Delta\theta^{true}$, subject to the receiver frequency offset, $\Delta f^{Rx}$ for the mobile device 200 based on $\Delta\theta^{first}$ and the signs of $p_{re}$, $p_{im}$. In step 918, the receiver frequency offset, $\Delta f^{Rx}$, may be determined or calculated by $$\Delta f^{Rx} = \frac{\Delta\theta^{true}}{2\pi} f_s,$$

where $f_s$ is a sampling frequency utilized for sampling the selected two successive samples.

In various exemplary aspects of the method and system for estimating a receiver frequency offset in a communication system, a mobile device such as the mobile device 114 may be operable to receive a radio frequency (RF) signal from the base station 110a. The received RF signal may comprise a physical signal such as a pilot signal, a reference signal, a PSS and/or a SSS. The mobile device 114 may be operable to select, via the phasor generator 506, two successive samples that are derived from the received physical signal such as a PSS. A single phasor, p, may be generated utilizing the selected two successive samples. For example, the single phasor, p, may be generated by $p = r_n r_{n-1}^* = p_{re} + jp_{im}$, where $r_n$, $r_{n-1}$ are phasors of the selected two successive samples, $r_{n-1}^*$ is the conjugate of $r_{n-1}$, and $p_{re}$, $p_{im}$ are the real and imaginary components of the generated single phasor, p. The angular increment estimator 508 may be operable to utilize the generated single phasor, p, to estimate a receiver frequency offset, $\Delta f^{Rx}$, for the received RF signal. Assume that the physical signal is a PSS, the mobile device 114 may be operable to detect the received PSS via a correlation process through the matched filter 504. The phasor generator 506 may be operable to select the two successive samples from correlation data associated with the detected PSS. An angular increment in the first quadrant, $\Delta\theta^{first}$, may be calculated by $$\Delta\theta^{first} = \tan^{-1}\left(\frac{|p_{im}|}{|p_{re}|}\right).$$

A lookup table such as the lookup table 820 may be utilized to determine an estimated $\Delta\theta^{first}$. An actual or true angular increment, $\Delta\theta^{true}$, subject to the receiver frequency offset, $\Delta f^{Rx}$, may be determined based on the estimated $\Delta\theta^{first}$ and corresponding signs of real and imaginary components, $p_{re}$, $p_{im}$. The receiver frequency offset, $\Delta^{Rx}$, may be determined or calculated by $$\Delta f^{Rx} = \frac{\Delta\theta^{true}}{2\pi} f_s,$$

where $f_s$ is a sampling frequency utilized for the two selected samples. The determined $\Delta f^{Rx}$ may be utilized to adjust a reference or local oscillator frequency of the mobile device 114.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for estimating a receiver frequency offset in a communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a mobile device:
 receiving a radio frequency (RF) signal comprising a physical signal;
 selecting two successive samples derived from said physical signal;
 generating a single phasor utilizing phasors of said selected two successive samples;
 calculating an angular increment in a first quadrant utilizing absolute values of corresponding real and imaginary components of said generated single phasor; and
 estimating a receiver frequency offset for said received RF signal based on said generated single phasor.

2. The method according to claim 1, wherein said physical signal comprises one of a pilot signal, a reference signal, and/or a primary synchronization signal.

3. The method according to claim 1, comprising detecting said physical signal via a correlating process.

4. The method according to claim 3, comprising selecting said two successive samples from correlation data associated with said detected physical signal.

5. The method according to claim 3, wherein said detecting of said physical signal includes identifying a primary synchronization signal (PSS) having a maximum PSS correlation peak magnitude.

6. The method according to claim 4, comprising generating said single phasor by conjugate multiplying said phasors of said selected two successive samples.

7. The method according to claim 4, wherein said selecting said two successive samples from said correlation data includes dividing a correlation interval of said correlation data into two equal length correlation intervals and obtaining a correlation phasor for each of said two equal length correlation intervals.

8. The method according to claim 1, wherein said calculating comprises estimating said angular increment in said first quadrant utilizing a lookup table.

9. The method according to claim 8, comprising determining an actual angular increment subject to said receiver frequency offset based on said estimated angular increment in said first quadrant, and corresponding signs of said real and imaginary components of said generated single phasor.

10. The method according to claim 9, comprising determining said receiver frequency offset based on said determined actual angular increment.

11. The method according to claim 1, comprising adjusting a local reference oscillator frequency of said mobile device based on said determined receiver frequency offset.

12. A system for communication, the system comprising:
one or more processors and/or circuits for use in a mobile device, wherein said one or more processors and/or circuits are operable to:
 receive a radio frequency (RF) signal comprising a physical signal;
 select two successive samples derived from said physical signal;
 generate a single phasor utilizing phasors of said selected two successive samples;
 calculate an angular increment in a first quadrant utilizing absolute values of corresponding real and imaginary components of said generated single phasor; and
 estimate a receiver frequency offset for said received RF signal based on said generated single phasor.

13. The system according to claim 12, wherein said physical signal comprises one of a pilot signal, a reference signal, and/or a primary synchronization signal.

14. The system according to claim 12, wherein said one or more processors and/or circuits are operable to detect said physical signal via a correlating process.

15. The system according to claim 14, wherein said one or more processors and/or circuits are operable to select said two successive samples from correlation data associated with said detected physical signal.

16. The system according to claim 15, wherein said one or more processors and/or circuits are operable to generate said single phasor by conjugate multiplying said phasors of said selected two successive samples.

17. The system according to claim 12, wherein said one or more processors and/or circuits are operable to estimate said angular increment in said first quadrant utilizing a lookup table.

18. The system according to claim 17, wherein said one or more processors and/or circuits are operable to determine an actual angular increment subject to said receiver frequency offset based on said estimated angular increment in said first quadrant, and corresponding signs of said real and imaginary components of said generated single phasor.

19. The system according to claim 18, wherein said one or more processors and/or circuits are operable to determine said receiver frequency offset based on said determined actual angular increment.

20. The system according to claim 12, wherein said one or more processors and/or circuits are operable to adjust a local reference oscillator frequency of said mobile device based on said determined receiver frequency offset.

* * * * *